United States Patent [19]

Abe

[11] Patent Number: 5,099,324
[45] Date of Patent: Mar. 24, 1992

[54] APPARATUS FOR EXTRACTING/COMBINING CHANGE REGION IN IMAGE CORRESPONDING TO MOVING OBJECT

[75] Inventor: Shozo Abe, Kawasaki, Japan

[73] Assignee: Kabushiki Kaisha Toshiba, Kawasaki, Japan

[21] Appl. No.: 544,588

[22] Filed: Jun. 27, 1990

[30] Foreign Application Priority Data

Jun. 30, 1989 [JP] Japan ................. 1-169644

[51] Int. Cl.$^5$ .............................. H04N 7/18
[52] U.S. Cl. .................... 558/108; 358/105
[58] Field of Search ............... 358/105, 108, 136, 167, 358/36

[56] References Cited

U.S. PATENT DOCUMENTS

| | | | |
|---|---|---|---|
| 4,694,329 | 9/1987 | Belmares-Sarabin et al. | 358/105 |
| 4,703,347 | 10/1987 | Yasuda et al. | 358/105 |
| 4,737,847 | 4/1988 | Araki et al. | 358/105 |
| 4,783,833 | 11/1988 | Kawabata et al. | 358/105 |
| 4,807,034 | 2/1989 | Takeuchi et al. | 358/105 |
| 4,908,704 | 3/1990 | Fujioka et al. | 358/105 |
| 4,951,137 | 8/1990 | Kisou et al. | 358/105 |
| 4,959,714 | 9/1990 | Lo et al. | 358/105 |

FOREIGN PATENT DOCUMENTS 0169888 7/1988 Japan .
0051889 3/1987 Japan .
0245891 10/1987 Japan .
0260787 11/1986 Japan .

Primary Examiner—James J. Groody
Assistant Examiner—Michael H. Lee
Attorney, Agent, or Firm—Oblon, Spivak, McClelland, Maier & Neustadt

[57] ABSTRACT

An area to be monitored is picked up by a TV camera, and data of the picked-up image is converted into digital data in units of frames and stored in frame memories. The image data stored in the frame memories are read out, and a change region is extracted as an image of a moving object. The extracted moving object image has a plurality of dispersed regions including a shadow image. Only the dispersed regions corresponding to the moving object are extracted by setting a frame, and a noise image including the shadow image is removed.

20 Claims, 4 Drawing Sheets

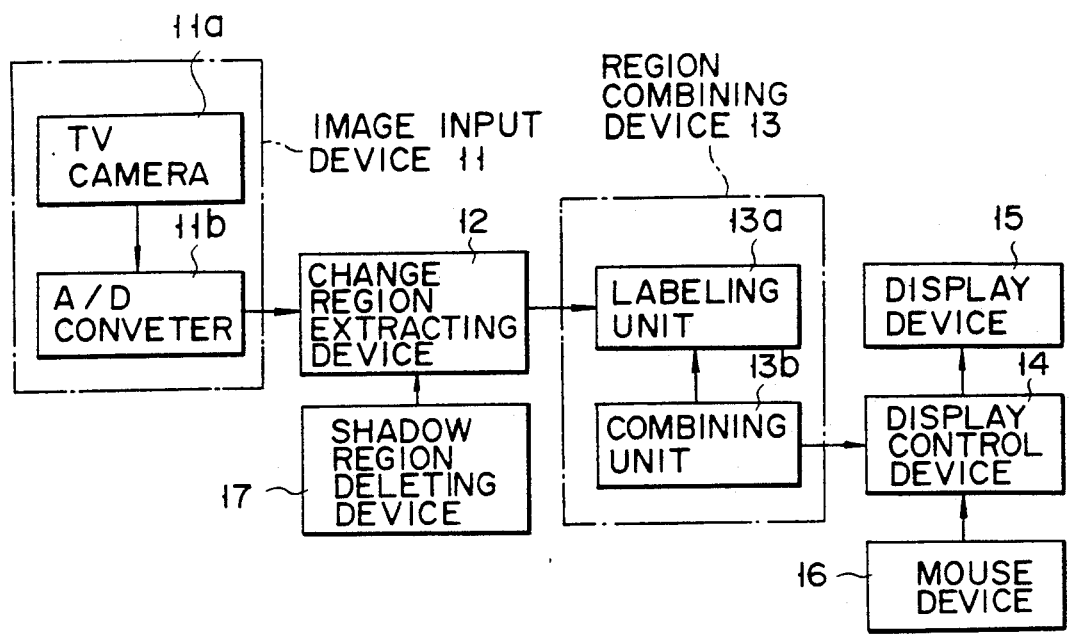
F I G. 1
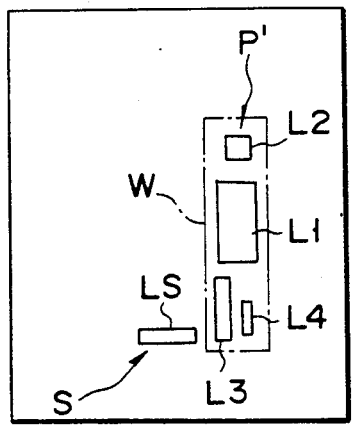
F I G. 2
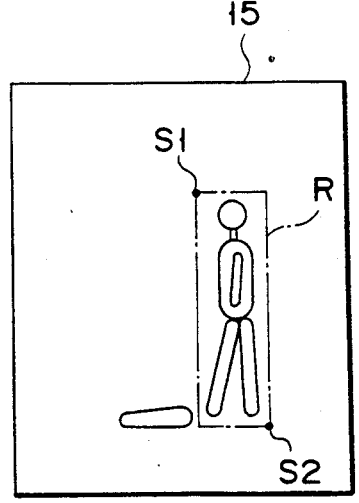
F I G. 3

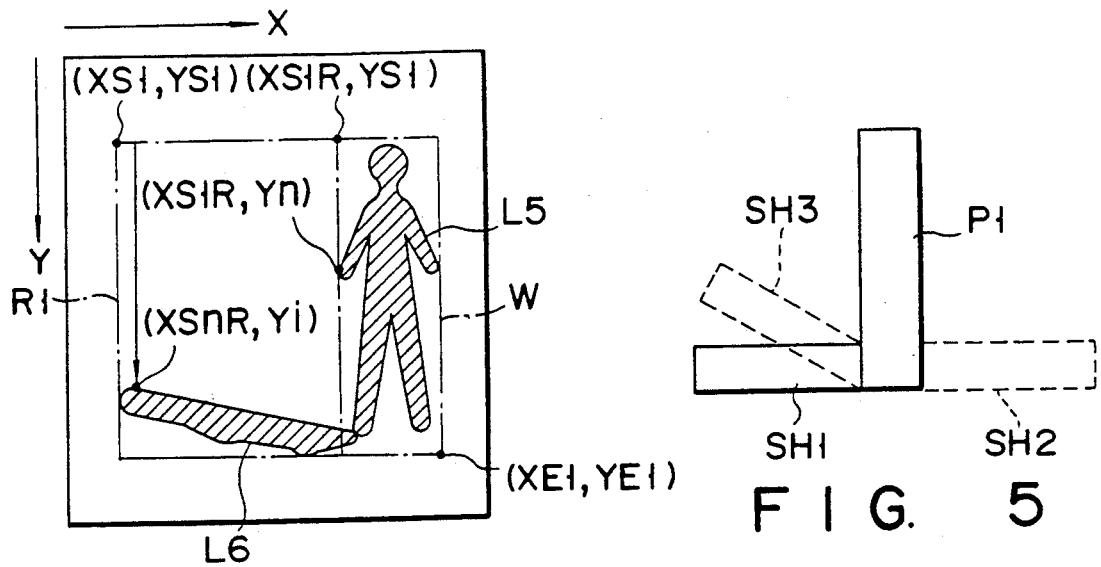
F I G. 4
F I G. 5
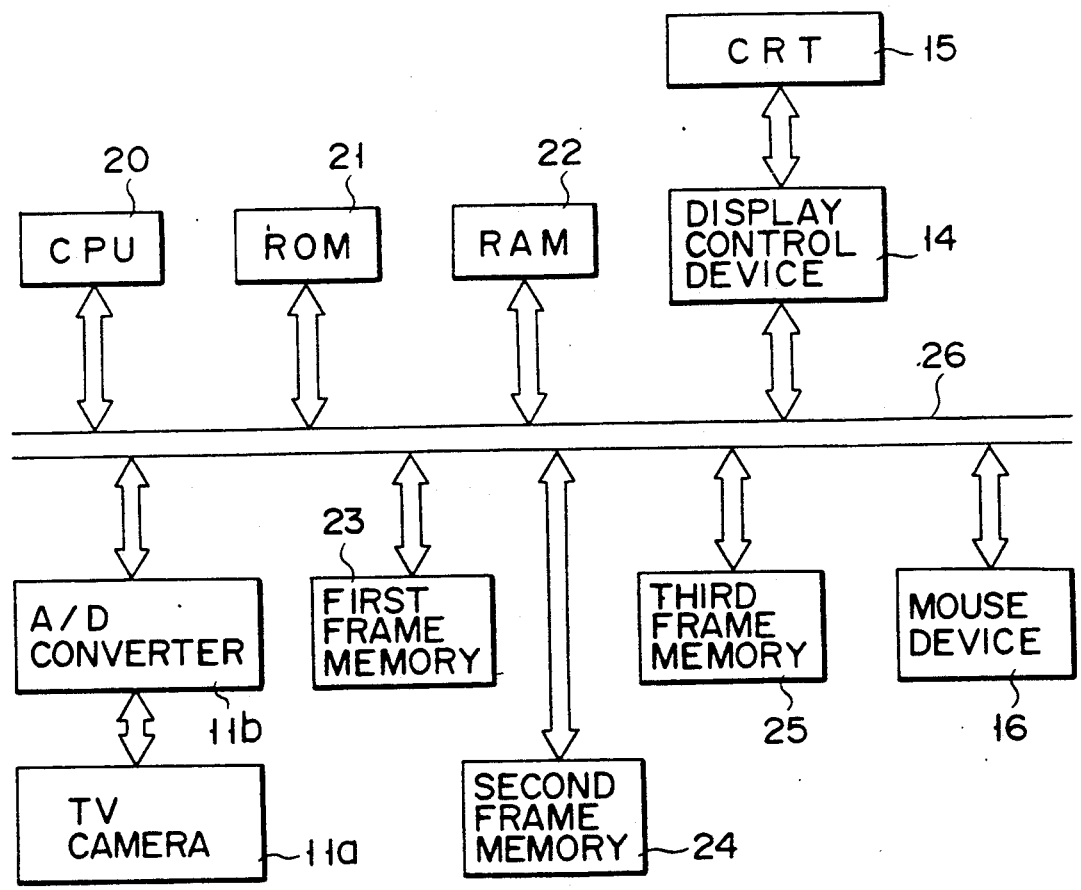
F I G. 6

APPARATUS FOR EXTRACTING/COMBINING CHANGE REGION IN IMAGE CORRESPONDING TO MOVING OBJECT

BACKGROUND OF THE INVENTION

1. Field of the Invention

The present invention relates to an image monitoring apparatus for detecting a moving object, such as an illegal trespasser, from image information obtained by picking up an area to be monitored and, more particularly, to an apparatus for combining dispersed images of a moving object extracted from an image.

2. Description of the Related Art

In a security system, for example, an image monitoring apparatus for picking up an area to be monitored by a television camera and detecting an illegal trespasser or the like from information of the picked-up image has been developed.

In such an image monitoring apparatus, in order to detect, e.g., an illegal trespasser, change information of an image obtained when an illegal trespasser moves in an image is extracted. In order to extract the change image, images separated by time intervals in a picked-up area to be monitored are subjected to subtraction to remove a stationary portion, thereby extracting only a change region (moving object).

That is, under the assumption that a one-to-one correspondence is present between a picked-up moving object and a change region extracted by subtraction, a moving object can be determined by extracting a change region.

In the same area to be monitored, however, shadow positions of a picked-up image are different between a fine day and a rainy day, and between in the morning and the evening. Therefore, if these shadow portions are processed as moving objects, movement of a real moving object cannot be correctly detected.

A change region in an image corresponding to a moving object is mostly dispersed and extracted in the image in accordance with a moving direction of the moving object in an area to be monitored, a fetching time interval of a picked-up image, or the like. In many cases, therefore, the shape of the picked-up moving object cannot be directly extracted.

Especially when a moving object is accompanied with a shadow region by sunshine or intense illumination, it is difficult to separately extract the moving object and the shadow region.

SUMMARY OF THE INVENTION

The present invention has been made to solve a problem in which since a change region of a moving object is dispersed and extracted in accordance with a picked-up environment of an area to be monitored or a moving direction of the moving object, it is difficult to reliably extract the moving object, and has as its object to provide a change region combining apparatus which can combine change regions corresponding to a moving object to reliably extract the moving object even when the change regions are dispersed.

A combining apparatus of the present invention comprises an image pick up means for picking up an image, a change region extracting means for extracting a change region of a moving object in accordance with a difference between images separated by time intervals in the image picked-up by the pick up means, a deleting means for deleting a noise region if the noise region continues to a plurality of change regions extracted by the change region extracting means, and a combining means for combining a plurality of change regions from which the noise region is deleted by the deleting means.

That is, according to the present invention, a noise region continuous to a plurality of change regions extracted by the change region extracting means is deleted by deleting means, and a plurality of change regions from which the noise region is deleted are combined by the combining means, thereby reliably obtaining the change regions of a moving object to be monitored.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing functions of an apparatus according to an embodiment of the present invention;

FIGS. 2 to 5 are schematic views for explaining each function shown in FIG. 1;

FIG. 6 is a block diagram showing an apparatus of an embodiment for realizing the functions shown in FIG. 1;

DETAILED DESCRIPTION OF THE PREFERRED EMBODIMENT

Figure 7:
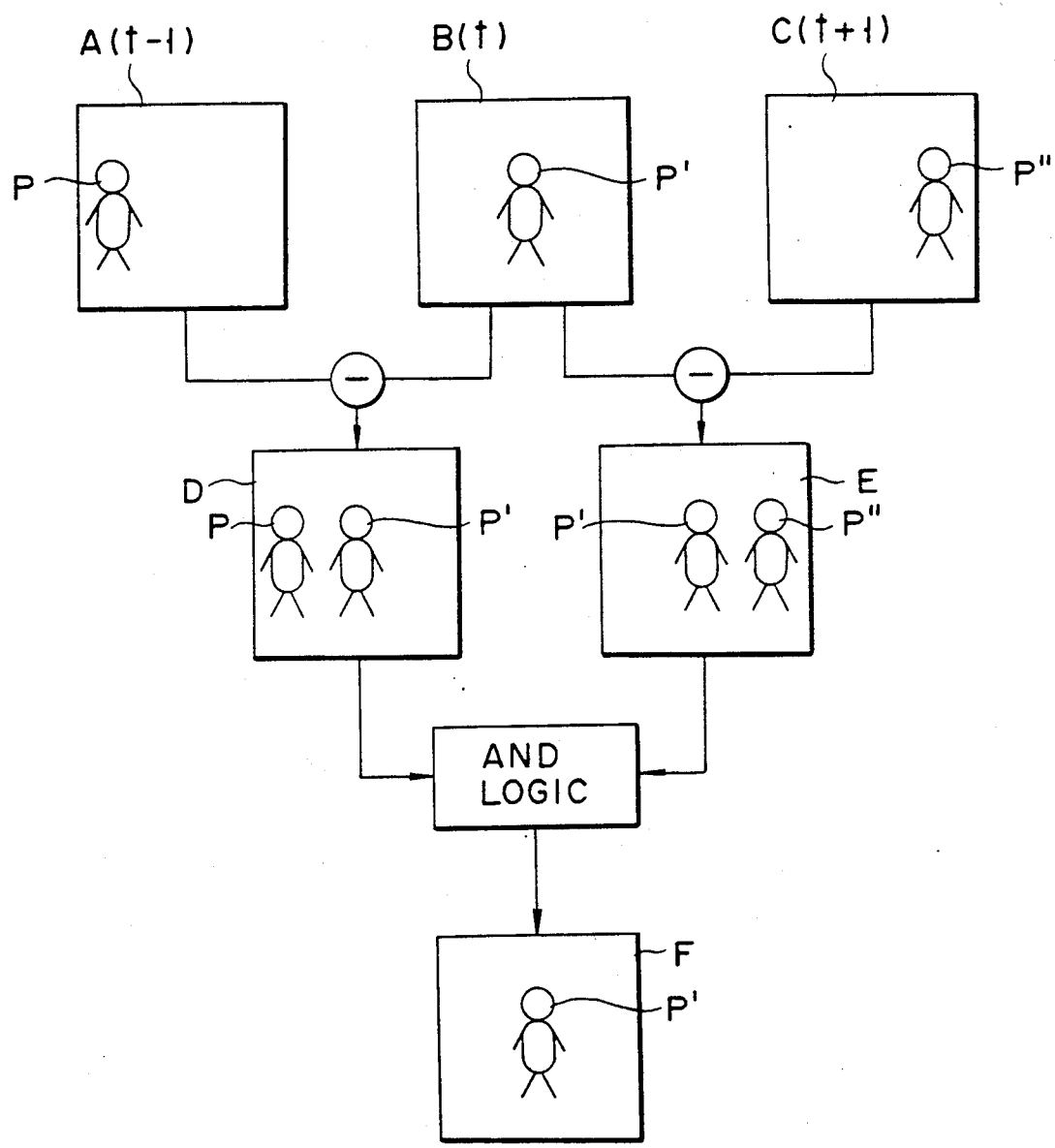
FIG. 7 is a view for explaining an operation of the apparatus shown in FIG. 6.

An embodiment of the present invention will now be described below with reference to the accompanying drawings.

Referring to FIG. 1, an image input device 11 is used for picking up an image of an area to be monitored and constituted by a television camera (TV camera) 11a and an A/D converter 11b for converting an image picked-up by the TV camera 11a into multivalue information. The TV camera 11a intermittently picks up time-serial images at predetermined time intervals, and each picked-up image is converted into digital multivalue information by the A/D converter 11b. The converted digital image is supplied to a change region extracting device 12.

The change region extracting device 12 executes subtraction, addition, or logical arithmetic processing for a plurality of time-serial images supplied from the image input device 11 in units of pixels, thereby extracting a change region of a moving object. In general, two or three time-serial images are used in the extraction processing. In this embodiment, a binary image obtained by performing subtraction and logical product processing for three time-serial images is used. This operation will be described in detail later.

In the above processing for obtaining a binary image, it is ideal to perfectly extract the shape of a moving object. In most cases, however, only dispersed portions of a moving object can be extracted. Therefore, dispersed portions of the change region extracted by the change region extracting device 12 is supplied to a region combining device 13 so as to be combined.

The change region combining device 13 is constituted by a labeling unit 13a for performing labeling for the change region supplied from the change region extracting device 12 to obtain a rectangular region, and a combining unit 13b for searching a region having a maximum area from the obtained rectangular region and combining rectangular regions present around the searched region.

FIG. 2 shows an example of an image output from the labeling unit 13a, in which a person P' and his or her shadow S are extracted by the change region extracting device 12.

When the person P' is constituted by rectangular regions L1 to L4 and the shadow S is constituted by a rectangular region Ls, the combining unit 13b searches a maximum region L1 from these rectangular regions, and regions around the region L1 are combined with the region L1. In this case, the area of combining is based on a preset frame W, and the regions L1 to L4 in the frame W are combined as a moving object. Therefore, the region Ls corresponding to the shadow S positioned outside the frame W is not combined with the person P'.

The frame W is set as follows.

That is, as shown in FIG. 3, a display device 15 displays an image output from the image input device 11 via a display control device 14. In this state, if an operator operates, e.g., a mouse device 16 connected as a pointing device to the display control device 14 to designate opposite corner positions S1 and S2 near the person P displayed on the display device 15, a rectangle R having the designated positions S1 and S2 as opposite corners is set, and this rectangle R is supplied as the frame W to the combining unit 13b.

A combined output from the region combining device 1 is supplied to the display control device 14. The display control device 14 generates an image obtained by superimposing a rectangle image including the change region of the moving object on the digital multivalue image and displays the image on the display device 15.

In this case, the rectangle information can be seen more clearly by reducing a concentration level of the digital multivalue image as a background as a whole.

If the multivalue image is uniformly obtained, the image itself cannot be clearly seen. In this case, an image corresponding to the rectangular region of the area to be monitored picked up by the TV camera 11a is superposed on the rectangular region to obtain a clear image.

A shadow region deleting device 17 is connected to the change region extracting device 12. When a shadow region continues to a change region of a moving object extracted by the change region extracting device 12, the region combining device 13 determines that these regions are not a person but a large moving object. Therefore, the shadow region deleting device 17 deletes the shadow region from the change region of the moving object.

That is, as shown in FIG. 4, when a shadow region L6 continues to a region L5 of a person extracted by the change region extracting device 12 to form one change region, this region is larger than the frame W. Therefore, the region combining device 13 determines that this region is not a person but a large moving object.

That is, when the change regions L5 and L6 are extracted as one continuous region, rectangular information R1=(XS1,YS1),(XE1,YE1) including the regions L5 and L6 is obtained. However, the size of this rectangle largely exceeds that of a rectangle (XS1R,YS1),(XE1,YE1) which indicates the size of a predetermined person.

In this case, the shadow region deleting device 17 detects a position (XSnR,Yi) of the change region L6 from the upper left point (XS1,YS1) of the extracted rectangle (XS1,YS1),(XE1,YE1) in a direction from a Y coordinate position YS1 to YE1. If the length of (Yi−YS1) is a half or more of (YE1−YS1), the device 17 obtains a position (XS1R,Yn), at which the length (Yi−YS1) becomes a half or less of (YE1−YS1), while updating XS1.

Similar processing is performed from the right end of the rectangular information R1 to cope with a case in which a sunshine direction changes in accordance with an image pick-up environment.

FIG. 5 shows a pattern of a person P1 and a shadow SH1 defined in this embodiment. In this embodiment, an inverted L shape in which shadow region SH1 continues to person P or an L shape in which a shadow region SH2 continues to the person P1 is defined as a basic pattern, and the shadow region is assumed to change as indicated by SH1, SH2, and SH3 in accordance with the sunshine.

In the above processing of FIG. 4, the region indicated by (XS1R,YS1),(XE1,YE1) can be obtained as a final region of a moving object, and the shadow region L6 can be deleted. By deleting the shadow region L6 in this manner, the region combining device 13 can reliably combine only change regions of the moving object.

According to this embodiment, the shadow region deleting device 17 can detect and delete a shadow region continuous to a moving object of interest in change regions of the moving object extracted by the change region extracting device 12. Therefore, the region combining device 13 can reliably combine only the change regions of the moving object.

Note that the direction and the length of a shadow continuous to a moving object depends on an image picking up environment. Therefore, by chain-coding change regions of a moving object to extract a shape feature pattern of the regions, thereby identifying the shadow and the change regions of the moving object. This shape feature pattern is effective provided that the shadow is continuously present below the change regions of a moving object.

In addition, in combining, in order to flexibly correspond to a shape change in human, especially a change in arm, combining can be performed in accordance with the position exceeding the size of a frame.

The embodiment shown in FIG. 1 is actually constituted by using a CPU 20 as shown in FIG. 6. In FIG. 6, the same reference numerals as in FIG. 1 denote the same parts. Referring to FIG. 6, the CPU 20 is connected to a bus 26, and all circuits to be controlled by the CPU 20 are also connected to the bus 26 A ROM 21 stores program data to be executed by the CPU 20, and predetermined program data is read out in accordance with address control by the CPU 20. A RAM 22 stores various types of data generated during execution of programs by the CPU 20, or the stored data is read out from the RAM 22 and used. Image information of a moving object picked-up by the TV camera 11a is converted into a digital signal by the A/D converter 11b and stored in the RAM 22 via the bus 26 under the control of the CPU 20. The image data stored in the RAM 22 is supplied to a CRT 15 via a display control device 14 and is displayed. A mouse device 16 is also connected to the bus 26. A pointer is moved on a display screen of the CRT 15 by using the mouse device 16 to input the diagonal coordinate positions S1 and S2 of the frame W described above.

This embodiment further includes three frame memories 23, 24, and 25 connected to the bus 26. The overall arrangement including the frame memories 23 to 25 has the functions shown in FIG. 1. An operation of the apparatus shown in FIG. 6 will be described below with reference to FIGS. 7 and 8.

The frame memories 23 to 25 shown in FIG. 6 are used in the change region extracting device 12. That is, data of an image A(t−1) obtained from the TV camera 11a via the A/D converter 11b at a timing (t−1) is stored in the first frame memory 23 under the control of the CPU 20. As shown in FIG. 7, a person image P is included as a moving object in the obtained image A(t−1). At the next frame timing (t), data of an image B(t) is obtained and stored in the second frame memory 24. A person image P' is included in the image B(t). The person image P is present at the left side of the screen in the image A(t−1), but the person image P' is moved to the center of the screen in the image B(t). At the next frame timing (t+1), data of an image C(t+1) including a person image P" moved to the right side of the screen is obtained and stored in the third frame memory 25 under the control of the CPU 20.

When the items of the image data obtained at the timings (t−1), t, and (t+1) are stored in the frame memories 23 to 25, the CPU 20 reads out the data of the two images A(t−1) and B(t) from the frame memories 23 and 24 and subtracts the readout data to obtain image data D. This image data D includes the two person images P and P'. The data D is stored in the RAM 22 under the control of the CPU 20. Similarly, the image data B(t) and C(t+1) are read out from the frame memories 24 and 25 and subtracted to obtain image data E. This image data E includes the data of the person images P' and P". The data E is also stored in the RAM 22.

The two subtracted data stored in the RAM 22 are read out again by the CPU 20, and the CPU 20 executes a logical product operation for obtaining an AND logic of the data. As a result, data of an image F from which the person images P and P" in the images D and E are removed and which includes only the person image P' included in both the data is obtained and stored in the RAM 22. Note that a noise image which irregularly appears during the above processing for obtaining the person image as a change region can be effectively removed by the AND logic arithmetic operation.

Referring to FIG. 7, when the image data D and E are obtained from the image data A(t−1), B(t), and C(t+1), the contents of the frame memories 23 to 25 are cleared, and image data of the subsequent frames are sequentially stored to similarly continue extraction of change regions. If sunshine or light from a lamp is incident from the right side of FIG. 7 onto the person images P, P', and P", shadows extend from feet of the person images P, P', and P" toward the left, and the person image P' in the image F finally obtained in FIG. 7 is extracted as a change region with a shadow corresponding to the shadow L6 shown in FIG. 4.

An operation of the shadow region deleting device 17 shown in FIG. 1 will be described below with reference to FIG. 4. In this embodiment, since only the person image P' shown in FIG. 7, i.e., only the person image L5 in FIG. 4 is important as an object to be monitored, a portion of the shadow L6 must be removed from the object to be monitored. Since this shadow L6 is present outside the frame W shown in FIG. 2, i.e., outside the rectangle coordinate positions (XS1R,YS1), (XE1,YE1) in FIG. 4, the shadow region L6 can be deleted by extracting the image L5 included in the frame W.

That is, when the change regions L5 and L6 are extracted as one continuous region in FIG. 4, the CPU 20 obtains diagonal coordinate positions (XS1,YS1),(XE1,YE1) indicating the rectangle R1 including the regions L5 and L6. For example, by sequentially checking the code of pixel data in the X direction in the memory storing the image data shown in FIG. 4, the code changes from "0" to "1" at a Y coordinate YS1, i.e., at a position in contact with the head top of the person image L5. This coordinate YS1 corresponds to the upper end of the Y coordinate of the rectangle R1. The code of the pixel data in the X direction is "1" at a position in contact with the lower end of the shadow L6. However, when the Y coordinate is decremented by one, all the codes of the pixel data in the X direction become "0", and this corresponds to the lower end of the Y coordinate.

Minimum and maximum values of the X coordinates having the code "1" correspond to the left and right ends of the X coordinate of the rectangle R1, respectively.

The size of the rectangle R1 obtained as described above is compared with that of the frame W which is input in advance. If the rectangle R1 is larger than the frame W, the shadow region L6 must be deleted from the rectangle R1 in order to obtain only the true person image L5. Deletion of the shadow L6 has been already described in detail above, and a further description thereof will be omitted.

Operations of the labeling unit 13a and the combining unit 13b shown in FIG. 1 will be described in detail below with reference to FIG. 8.

An image of a moving object extracted via the change region extracting device 12 as described above is actually constituted by a plurality of (in this embodiment, four) dispersed regions L1, L2, L3, and L4 as a person image P' in the frame W shown in FIG. 2. Referring to FIG. 2, although the rectangular region LS representing the shadow image S is included, the shadow image S will be removed when the image is processed by the labeling unit 13a and the combining unit 13b as follows.

Figure 8:
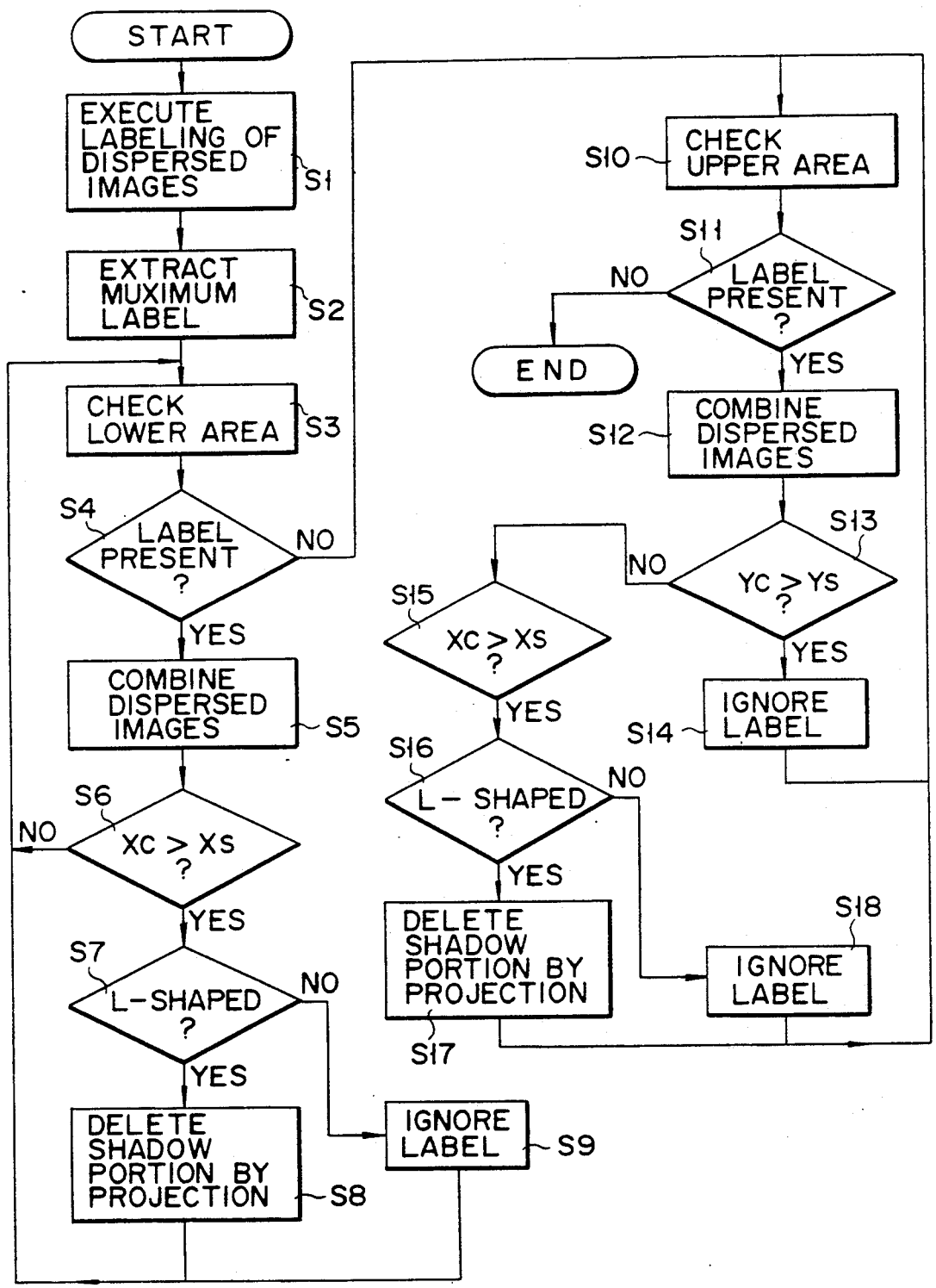
FIG. 8 is a flow chart for explaining an operation of a CPU shown in FIG. 6.

That is, referring to FIG. 6, the image data including the dispersed regions L1 to L4 shown in FIG. 2 is stored in the RAM 22, and labeling of these regions L1 to L4 is executed in step S1 in FIG. 8 under the control of the CPU 20. As a result, labels L1 to L4 are given to the dispersed regions as shown in FIG. 2.

The flow advances to step S2, and the label of a region having a maximum area of the given labels L1 to L4 (in this case, L1) is extracted.

The flow advances to steps S3 and S4, and the CPU 20 checks whether other labeled regions are present below the region having the maximum label L1, i.e., in a lower area of the frame W. In this case, since the two dispersed regions L3 and L4 are present below the dispersed region L1, the flow advances to step S5, and the regions L1, L3, and L4 are combined as one region.

In step S6, the CPU 20 checks whether other image regions are present below the region L1 and at the right or left side in the X direction of the frame W. In this case, since the shadow region LS is present, YES is obtained in step S6, and the flow advances to step S7. In step S7, the CPU 20 checks whether a pattern formed by the shadow region LS and the moving image P' in the frame W is L-shaped (including an inverted L shape).

Since the image shown in FIG. 2 is L-shaped (inverted L shape), the flow advances to step S8, and a portion of the shadow region LS is deleted by projection. Note that even if other labeled regions are found at both the sides of the frame W in step 7, the labeled regions are ignored in step S9 if the overall pattern does not form an L-shaped pattern.

After the regions below the maximum label L1 are combined and the shadow region is removed, NO is obtained in step S4. The flow advances to steps S10 and S11 and the CPU 20 checks whether other labeled regions are present above the maximum label L1, i.e., in an upper area of the frame W. Since the labeled region L2 is present in FIG. 2, the flow advances to step S12, and the region L2 is combined.

In step S13, the CPU 20 checks on the basis of the coordinate Ys at the lower end in the Y direction of the frame W, whether other labeled regions (Yc) are present above and below the frame W (Yc>Ys). If YES in step S13, the flow advances to step S14, and processing for ignoring all these labeled regions is executed.

If no labeled region is present above and below the frame W in step S13, the flow advances to step S15, and the CPU 20 checks whether other labeled regions are present above the maximum labeled region L1 and at both the sides in the X direction of the frame W (Xc>Xs). Although no region is present in FIG. 2, if a corresponding region is present, the flow advances to step S16, and the CPU 20 checks whether this region and the region in the frame W form an L-shaped pattern. If an L-shaped pattern is formed, the CPU 20 determines that the region is a shadow region and deletes the region by projection in step S17. If no L-shaped pattern is formed, the CPU 20 performs processing for ignoring the labeled region in step S18.

When the above processing is executed for all the labeled dispersed regions, NO is obtained in step S11, and labeling, combining, and shadow region deleting are completed. As a result, data representing a correct image of the moving object is obtained and displayed on CRT 15 under the control of the CPU 20.

Additional advantages and modifications will readily occur to those skilled in the art. Therefore, the invention in its broader aspects is not limited to the specific details, and representative shown and described herein. Accordingly, various modifications may be implemented in the described present invention without departing from the spirit or scope of the general inventive concept as defined by the appended claims and their equivalents.

What is claimed is:

1. An image information processing apparatus comprising:

image pickup means for picking up image information in an area to be monitored at predetermined time intervals to obtain a plurality of items of image information;

extracting means for extracting an image of a moving object included in the plurality of picked up image information; and deleting means for deleting a noise image including a shadow image of the moving object obtained adjacent to the image of the moving object.

2. An apparatus according to claim 1, wherein said extracting means includes:

memory means for storing continuous first, second, and third items of image information of the plurality of items of image information;

first subtracting means for obtaining a first difference image between the first and second items of image information stored in said memory means;

second subtraction means for obtaining a second difference image between the second and third items of image information stored in said memory means; and means for obtaining the image of the moving object by performing logical AND of the first and second difference images obtained from said first and second subtracting means.

3. An apparatus according to claim 1, wherein said extracting means includes:

means for obtaining a plurality of dispersed images as the image of the moving object;

means for setting a frame for covering a predetermined region including the image of the moving object; and means for performing predetermined labeling for the dispersed images.

4. An apparatus according to claim 3, wherein said noise image deleting means includes:

means for determining whether the plurality of dispersed images are included in the frame; and means for ignoring the dispersed images not included in the frame as noise images.

5. An apparatus according to claim 4, wherein said determining means includes:

means for determining whether the dispersed images included in the frame and the dispersed images not included in the frame together form an L-shaped pattern; and means for ignoring the dispersed images not included in the frame as a shadow image if an L-shaped pattern is determined.

6. An apparatus according to claim 1, wherein said extracting means includes means for setting a predetermined region including the moving object as a frame.

7. An apparatus according to claim 6, wherein said noise image deleting means includes means for processing an image obtained outside the frame as a noise image.

8. An image information processing apparatus, comprising:

image pickup means for picking up image information in an area to be monitored at predetermined time intervals to obtain a plurality of items of image information;

extracting means for extracting an image of a change region included in the plurality of picked up image information, said extracting means including memory means for storing continuous first, second and third images of the plurality of items of image information, first subtracting means for obtaining a first difference image between the first and second items of image information stored in the memory means, second subtracting means for obtaining a second difference image between the second and third items of image information stored in said memory means, and means for obtaining the image of the moving object to perform logical AND of said first and second difference images obtained from said first and second subtracting means;

deleting means for deleting a noise image including a shadow image obtained adjacent to the image of the change region; and means for shaping the image of the change region to obtain a moving object image.

9. An apparatus according to claim 8, wherein said extracting means includes:

means for obtaining a plurality of dispersed images as the image of the moving object;

means for setting a frame for covering a predetermined region including the image of the moving object; and means for performing predetermined labeling for the dispersed images to form labeled dispersed images.

10. An apparatus according to claim 9, wherein said noise image deleting means includes:

means for determining whether the plurality of dispersed images are included in the frame; and means for ignoring the dispersed images not included in the frame as noise images.

11. An apparatus according to claim 10, wherein said determining means includes:

means for determining whether the dispersed images included in the frame and the dispersed images not included in the frame together form an L-shaped pattern; and means for ignoring the dispersed images not included in the frame as a shadow image if an L-shaped pattern is determined.

12. An apparatus according to claim 8, wherein said extracting means has means for setting a predetermined region including the moving object as a frame.

13. An apparatus according to claim 12, wherein said noise image deleting means includes means for processing an image obtained outside the frame as a noise image.

14. An apparatus according to claim 9, wherein said shaping means includes:

detecting means for detecting labeled dispersed images included in the frame;

extracting means for extracting a labeled region having a maximum area of the detected dispersed images;

detecting means for detecting all labeled regions present above and below the maximum labeled region and included in the frame; and combining means for combining all the detected labeled regions with the maximum labeled region.

15. An image information processing apparatus comprising:

image pickup means for picking up image information in an area to be monitored at predetermined time intervals to obtain a plurality of items of image information;

extracting means for extracting an image of a moving object included in the plurality of picked up image information, said extracting means including means for setting a predetermined region including the moving object as a frame; and deleting means for deleting a noise image including a shadow image of the moving object obtained adjacent to the image of the moving object.

16. An apparatus according to claim 15, wherein said extracting means includes:

memory means for storing continuous first, second and third items of image information of the plurality of items of image information;

first subtraction means for obtaining a first difference image between the first and second items of image information stored in said memory means;

second subtraction means for obtaining a second difference image between the second and third items of image information stored in said memory means; and means for obtaining the image of the moving object by performing logical AND of the first and second difference images obtained from said first and second subtraction means.

17. An apparatus according to claim 15, wherein said extracting means includes:

means for obtaining a plurality of dispersed images as the image of the moving object;

means for setting a frame for covering a predetermined region including the image of the moving object; and means for performing predetermined labeling for the dispersed images.

18. An apparatus according to claim 17, wherein said noise image deleting means includes:

means for determining whether the plurality of dispersed images are included in the frame; and means for ignoring the dispersed images not included in the frame as noise images.

19. An apparatus according to claim 18, wherein said determining means includes:

means for determining whether the dispersed images included in the frame and the dispersed images not included in the frame together form an L-shaped pattern; and means for ignoring the dispersed images not included in the frame as a shadow image if an L-shaped pattern is determined.

20. An apparatus according to claim 15, wherein said noise image deleting means includes means for processing an image obtained outside the frame as a noise image.

* * * * *